United States Patent [19]

Shaffer

[11] Patent Number: 5,673,253

[45] Date of Patent: Sep. 30, 1997

[54] DYNAMIC ALLOCATION OF TELECOMMUNICATIONS RESOURCES

[75] Inventor: Shmuel Shaffer, Palo Alto, Calif.

[73] Assignee: Siemens Business Communication Systems, Iselin, N.J.

[21] Appl. No.: 609,152

[22] Filed: Feb. 29, 1996

[51] Int. Cl.$^6$ ............................ H04J 3/08; H04J 3/16
[52] U.S. Cl. ........................ 370/229; 370/431; 370/468
[58] Field of Search ........................... 370/229, 230, 370/468, 465, 259, 260, 359, 357, 431, 463

[56] References Cited

U.S. PATENT DOCUMENTS

| | | | |
|---|---|---|---|
| 4,504,942 | 3/1985 | Aro | 370/58 |
| 4,558,444 | 12/1985 | Kennedy | 370/58 |
| 4,679,191 | 7/1987 | Nelson | 370/468 |
| 5,161,152 | 11/1992 | Czerwiec et al. | 370/84 |
| 5,181,106 | 1/1993 | Sutherland | 358/86 |
| 5,231,649 | 7/1993 | Duncanson | 375/38 |
| 5,263,025 | 11/1993 | Torii et al. | 370/94.2 |
| 5,282,202 | 1/1994 | Bernstein et al. | 370/94.1 |
| 5,450,396 | 9/1995 | Havermans | 370/58.2 |
| 5,450,486 | 9/1995 | Maas | 379/399 |

*Primary Examiner*—Douglas W. Olms
*Assistant Examiner*—Matthew C. Phillips

[57] ABSTRACT

A network node and a method of dynamically allocating bandwidth for intranodal and internodal telecommunications sessions include monitoring resource utilization at both a line shelf level and a system-wide level. In one embodiment, the dynamic allocation of bandwidth is applied to multimedia conferencing between subscribers of the same private branch exchange (PBX). If resource utilization at one or both of the line shelves that are involved in the intranodal session reaches or exceeds a preselected maximum threshold, bandwidth reallocation is triggered. In like manner, if a switching fabric of the PBX has reached a resource utilization maximum threshold that threatens system-wide blocking of any additional sessions, resources are reallocated for the system in order to free bandwidth. Utilization thresholds preferably adaptively vary on an hour-to-hour basis and/or a day-to-day basis. In the preferred embodiment, a hierarchy of classes of service determines which sessions will be subjected to bandwidth reduction.

21 Claims, 3 Drawing Sheets

DYNAMIC ALLOCATION OF TELECOMMUNICATIONS RESOURCES

TECHNICAL FIELD

The invention relates generally to telecommunications and more particularly to a device and method for dynamically allocating resources of a network node.

BACKGROUND ART

Telecommunications sessions may take place between two nodes of a network, i.e. internodal communication, or may take place between two subscribers of the same node, i.e. intranodal communication. A session that is limited to voice transmission typically requires only two channels (one channel in each direction). On the other hand, a fully integrated voice, data, and video session, i.e. multimedia communication, requires additional channels. The quality of service provided during a video conferencing session depends partially upon the number of channels allocated for the session, since the allocation of channels determines the available bandwidth.

A node in a network of nodes includes at least one level of resource limitation. A switching fabric of the node is used to route telecommunications sessions. The switching fabric links the node to other nodes of the network via an external trunk. For example, a private branch exchange (PBX) may be linked to a central office via an external trunk. There is a limitation as to the routing capacity of the switching fabric.

A lower level limitation may be imposed by node components that act as interfaces between the switching fabric and individual subscribers of the PBX. For example, U.S. Pat. No. 5,181,107 to Sutherland describes a video line shelf arrangement that allows incremental growth of video channels available to subscribers of a particular node at which the line shelves are utilized. The video line shelf arrangement may include a number of line shelves arranged one above another. Each video line shelf may include an array of slots, with video line cards being removably inserted into the slots. Each line shelf may support 96 subscriber lines. However, often a line shelf is connected to more subscribers than it can support simultaneously, since it is not likely that all subscribers will require access at the same time. Consequently, the line shelves impose a limit as to the number of subscribers that can obtain access at a single time.

As previously noted, multimedia communications require greater bandwidth than sessions that are limited to voice transmissions. As a result, access limitations are a growing concern. A DS0-level subscriber line has a bandwidth of 64 Kb/sec. By using a known timeslot assigner function, a line shelf can support higher bandwidth interfaces by combining a number of DS0 channels. For example, 24 DS0 channels can be combined to provide a bandwidth of 1,536 Mb/sec, which is also known as T1 transmission. However, the increase in bandwidth taxes the capacity of the PBX.

For a video conferencing call, the quality of service is determined during call setup. For an internodal communication, each of the nodes involved in the transmission is included within a negotiation to determine bandwidth for the session. Once the quality of service is determined, it is the responsibility of lower layers of the protocol to provide the agreed-upon bandwidth. If one of the channels is inadvertently disconnected, the protocol automatically initiates a call setup for an additional channel, in order to maintain the quality of service.

The negotiated bandwidth of an internodal session may be fixed. Then, in a situation in which demand for access to and from a particular PBX exceeds the routing capacity of the switching fabric of the PBX, a blocking condition will occur. That is, additional sessions will be blocked until at least one of the previously established communications sessions is released. As an alternative to the fixed bandwidth approach, U.S. Pat. Nos. 5,282,202 to Bernstein et al. and 5,263,025 to Torii et al. describe communication systems having variable bandwidth for internodal communications. In Bernstein et al., a succession of composite frames that convey multimedia information is launched from one of two endpoint nodes to the other endpoint node on a network path, with each of the frames configured to contain a plurality of fixed size channels representing bandwidth allocations for each of the traffic component types, e.g., voice, video and data traffic component types. Each channel is assigned to a different subscriber, depending upon the traffic component type, at the endpoint node from which the composite frame is launched. The composite frames are dynamically reconfigured by releasing and reassigning channels at each of the endpoint nodes when necessary in order to accommodate changes in traffic flow within the network. The communication system of Torii et al. includes a variable bandwidth terminal that can change its communication bandwidth during an internodal communication, so as to obtain as many call interconnections as possible. If a communication-use rate of an internodal communication line is greater than a predetermined value and the transmission devices are able to communicate at a bandwidth that is less than what was previously allocated, the bandwidth may be decreased for the remainder of the communication.

The Bernstein et al. and Torii et al. patents reduce a risk that PBX-to-PBX communications will create a blockage condition. However, as multimedia sessions increase in popularity, the susceptibility of PBXs in a network to encountering blockage conditions increases. Moreover, there may be some instances in which reallocating bandwidth of previously established sessions in accordance with the teachings of Bernstein et al. and/or Torii et al. will not alleviate the condition, e.g., all of the internodal sessions are two-channel communications.

What is needed is a network node and a method of operating the node to provide dynamic channel allocation for intranodal and internodal sessions, thereby reducing the likelihood that resources of the network node will reach a condition of exhaustion.

SUMMARY OF THE INVENTION

A network node within a telecommunications network of nodes allows telecommunications resources to be freed from sessions between two subscribers of the same node when at least one level of two or more levels of resources approaches maximum operational capacity. At a subsystem level, channel (i.e., bandwidth) reallocation may be triggered by detection that a utilization threshold has been reached for one line shelf in a multishelf network node. At a system level, reallocation may be triggered by detection that a utilization threshold has been reached with respect to the routing capacity of a switching network. Thus, dynamic allocation is not limited to application to sessions between subscribers of different nodes. Instead, the bandwidth of selected intranodal sessions may be reduced when a threshold of resource usage is reached.

In the preferred embodiment, separate groups of subscriber lines are supported by different line shelves. Each line shelf provides access and control to its supported subscriber lines via a limited number of channels. An intranodal telecommunications session may occur by means of subscriber lines of the same line shelf or may occur by means of subscriber lines of different line shelves. Still referring to the preferred embodiment, the network node is a private branch exchange (PBX) and the sources of information to the subscriber lines include video, voice, control and data sources. That is, the preferred embodiment addresses multimedia telecommunications. However, the invention applies equally to any service in which a reduction in bandwidth results in a lower, but still acceptable, quality of service.

Each line shelf is connected to a switching fabric that is a system-wide level of concern with regard to resource capacity. Both intranodal and internodal communications are routed via the switching fabric. Any of the known switching fabrics may be employed. If the routing capacity of the switching fabric is reached, a blocking condition occurs.

Upon the initiation of a telecommunications session, channels are allocated to the session in order to achieve the desired quality of service. The bandwidth of the communications is determined by the number of channels involved. Utilization of the individual line shelves and of the switching fabric is monitored. If the availability of resources of one of the components is detected as being below a predetermined threshold level, bandwidth reallocation is triggered. The reallocation is designed to ensure free channels for subsequent telecommunications sessions. The bandwidth of one or more established intranodal sessions is reduced. As a result, the quality of service of the affected session is reduced. However, the PBX is less likely to block a call.

Monitoring the line shelves and the switching fabric may be implemented by means of a variety of approaches. In a closed loop approach, monitoring circuitry is connected directly to the switching fabric and to each line shelf to individually track the utilization of each component. On the other hand, an open loop approach may merely track assignments of tasks to individual components, without requiring connections to the components. In this open loop approach, the assignment history is "monitored," but the session-connecting circuits of the line shelves and the switching fabric are not monitored directly.

Utilization thresholds may be set to different levels. For example, there may be a higher utilization threshold at the line shelf level than at the switching fabric level, if blockage at the line shelf level is of less concern than blockage at the switching fabric level. The utilization thresholds may also be time-dependent. That is, the thresholds that must be reached before reallocation is triggered may vary with the time of the day and/or the day of the week or year. Time-dependent thresholds may be implemented in order to ensure that there are adequate free resources during peak traffic times (e.g., 8:00 AM to 5:00 PM), while not wastefully freeing resources during low-demand times. As a third embodiment of threshold setting, the utilization thresholds may be adaptive. That is, there may be a learning time in which historical data of resource utilization is collected for predictive allocation, whereafter the data is employed to vary the utilization thresholds on an hour-by-hour and/or day-by-day basis, while updating data is continually being collected. The historical data may be used to predict availability of bandwidth for users who provide advance notice of an upcoming session that will require significant bandwidth.

A hierarchy of classes of service may be defined in order to protect those sessions which cannot tolerate reduced quality of service. Consequently, the selection of candidates for resource-freeing takes into account the specific applications and ensures that the reduction of bandwidth does not reduce resources to below the particular basic needs of any session.

In the event that the termination of sessions continues to free resources after the reallocation, a second reallocation may occur in order to restore the original quality of service. However, the fluctuation between the desired and the reduced bandwidth should not be so frequent as to detract from the communication. Thus, the threshold for increasing bandwidth is preferably different from the threshold for decreasing bandwidth. For example, bandwidth reduction of intranodal and/or internodal sessions may occur when a line shelf or the switching fabric is detected as reaching 98% capacity, while bandwidth addition may require that the capacity level then fall below 90% utilization.

A reduction of bandwidth of an intranodal session may be executed unilaterally. On the other hand, bandwidth reduction of an internodal session preferably is preceded by a negotiation between the two nodes to which the session participants subscribe.

While the invention will be described with respect to allocating and reallocating channels, this is not critical. The invention extends to other network nodes which allow resources to be freed by varying bandwidth.

An advantage of the invention is that the resources of a PBX are less likely to be exhausted. By monitoring the utilization of each line shelf and the central switching fabric, and by applying a dynamic allocation approach to intranodal sessions, a greater number of sessions may be supported without an increase in resources. As the benefits of intranodal video conferencing increase, the risk that intranodal sessions will block entrance of calls from another PBX also increases.

BEST MODE FOR CARRYING OUT THE INVENTION

Figure 1:
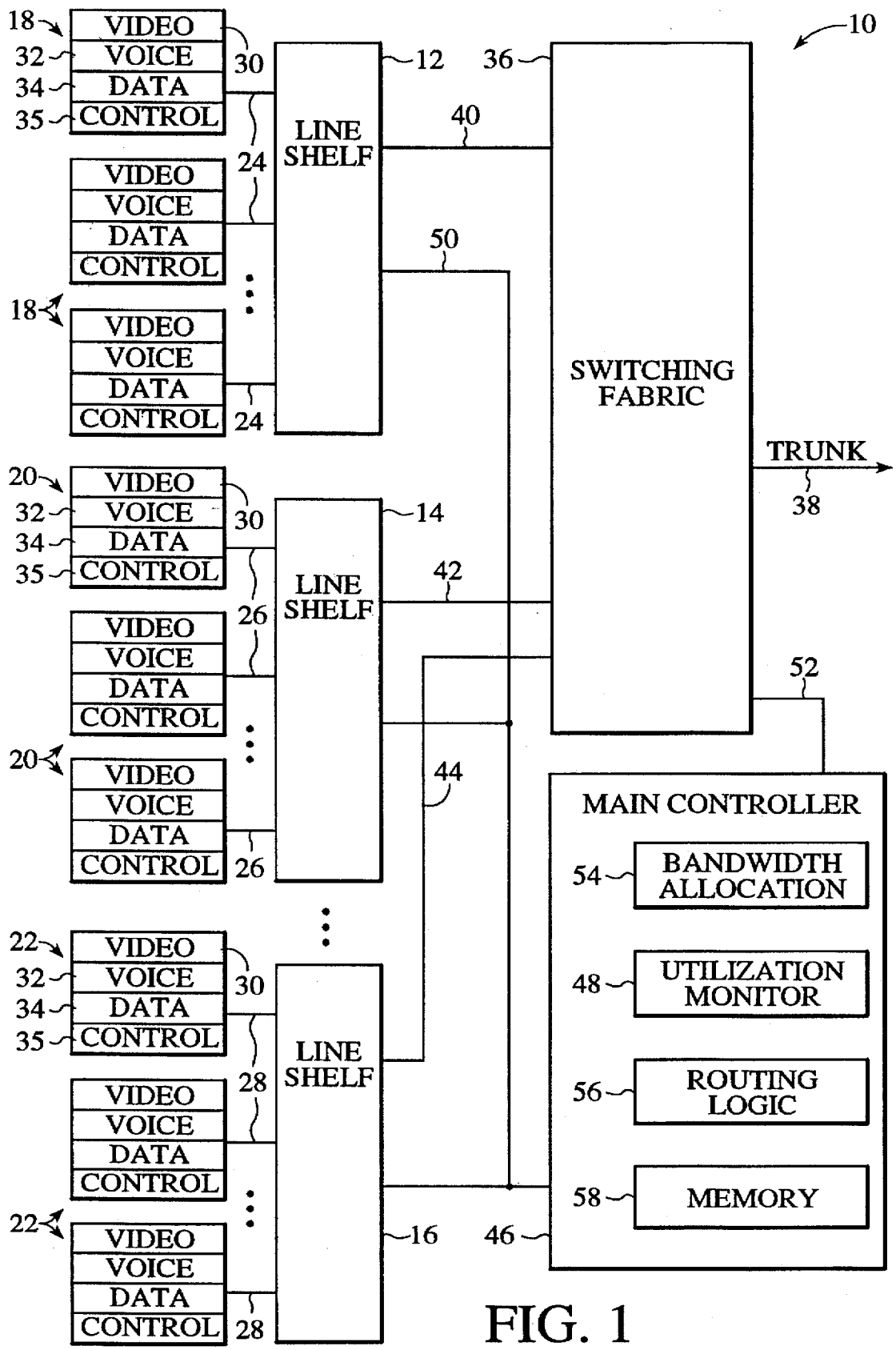
FIG. 1 is a block diagram of the components of one embodiment of a network node having dynamic bandwidth allocation in accordance with the invention.

With reference to FIG. 1, a network node 10 for telecommunications is shown as including three line shelves 12, 14 and 16. Each line shelf supports a number of user units 18, 20 and 22 via subscriber lines 24, 26 and 28. Each unit includes four devices 30, 32, 34 and 35 for transmitting and receiving video, voice, data and session-control information. For example, the video portion 30 may include a camera and a monitor, the voice portion 32 may include a microphone and a speaker, the data portion 34 may be a facsimile machine, and the session-control portion may include adjustors for varying the other three devices of both units involved in a session (e.g., an adjustor that causes a camera of a remote unit to provide camera zoom). While the network node 10 is illustrated as being one for multimedia communications, this is not critical to the invention.

The line shelves may be of the type known in the industry. For example, each line shelf may be a multimedia line shelf having slots to receive as many as sixteen line cards. Each line card provides six channels, so that a line shelf having the maximum sixteen line cards provides the maximum of ninety-six channels.

A telecommunications session that is restricted to voice communication conventionally requires two channels, one for each direction, so that a line shelf 12–16 that provides ninety-six channels can service forty-eight voice sessions simultaneously. However, often a line shelf is connected to more subscribers than it can support simultaneously, since it is assumed that not all of the supported subscribers will require access at the same time. This imposes a first limit as to the available resources for multiple telecommunications sessions. The limit is of increasing concern with the increase in the use of multimedia sessions. A single multimedia session may use twenty-four channels. The same session can be conducted using fewer channels, but with some loss in the quality of service. Therefore, it is typical for two endpoint nodes of a multimedia session to negotiate for a desired bandwidth during a call session and to then access the necessary number of channels in order to achieve the negotiated bandwidth that provides the quality of service. For most prior art nodes, once a session begins, the number of channels that are allocated to a session does not change. Consequently, if established sessions exhaust all of the channels of a particular line shelf, incoming calls to the line shelf will be blocked.

Blockage can also occur at a system-wide level. Each of the line shelves 12–16 is connected to a switching fabric 36 that routes telecommunications sessions between units 18–22 of the same line shelf, and/or a unit of one line shelf to a unit of a second line shelf, and/or one of the units of FIG. 1 to a unit of a second network node, not shown. These first two types of sessions are referred to herein as "intranodal sessions," while the node-to-node session is referred to herein as an "internodal session." An internodal session is carried on via an external trunk 38. For example, the network node 10 may be a private branch exchange (PBX) that is linked to a central office by the external trunk 38.

Switching fabrics are well known in the art. The switching fabric 36 has a limited capacity with regard to routing of intranodal and internodal sessions. For example, there are limitations with regard to allocation of timeslots, which occur in time division multiplexing or switching, as is well known in the art. Moreover, there are limitations on the capacity of video/voice/data/control transmissions across buses 40, 42 and 44 that link the switching fabric 36 to the individual line shelves 12–16. If the routing capacity of the switching fabric is exhausted, a blocking condition will be reached for any additional outgoing or incoming calls.

The network node 10 of FIG. 1 reduces the likelihood that blockage conditions will occur on a line shelf level or on a system-wide level. The main controller 46 includes utilization-level circuitry 48 which monitors each of the line shelves 12–16 and the switching fabric 36. The circuitry continuously tracks the availability of bandwidth both at the shelf level and at the system-wide level. In one embodiment of the circuitry 48, utilization data is acquired directly from the individual line shelves 12–16 and the switching fabric 36 via control buses 50 and 52. This closed loop embodiment requires direct connections to the various components of the network node. Alternatively, an assignment history of tasks that are assigned to the various components can be monitored, so that the individual connections are not required. This alternative approach may be viewed as an open loop approach. The invention is not limited to any particular approach to tracking utilization levels of the components.

If the utilization of resources is such that a blockage condition is approached, bandwidth allocation circuitry 54 attempts to free resources from established sessions in order to ensure free channels for subsequent telecommunications sessions. For example, the bandwidth of one or more established intranodal sessions may be reduced. The quality of service of the affected session or sessions will also be reduced, but the network node 10 is less likely to block an incoming or an outgoing call.

The main controller 46 also includes routing logic 56 for operating the switching fabric 36. Memory circuitry 58 may be used to store a hierarchy of classes of service. The hierarchy prioritizes which intranodal and internodal sessions are to be affected if bandwidth is to be freed. Moreover, the memory circuitry may be used to store the utilization thresholds at which bandwidth reallocation is to be triggered. As will be explained more fully below, the thresholds may be fixed, but are preferably time-dependent and adaptive.

Figure 2:
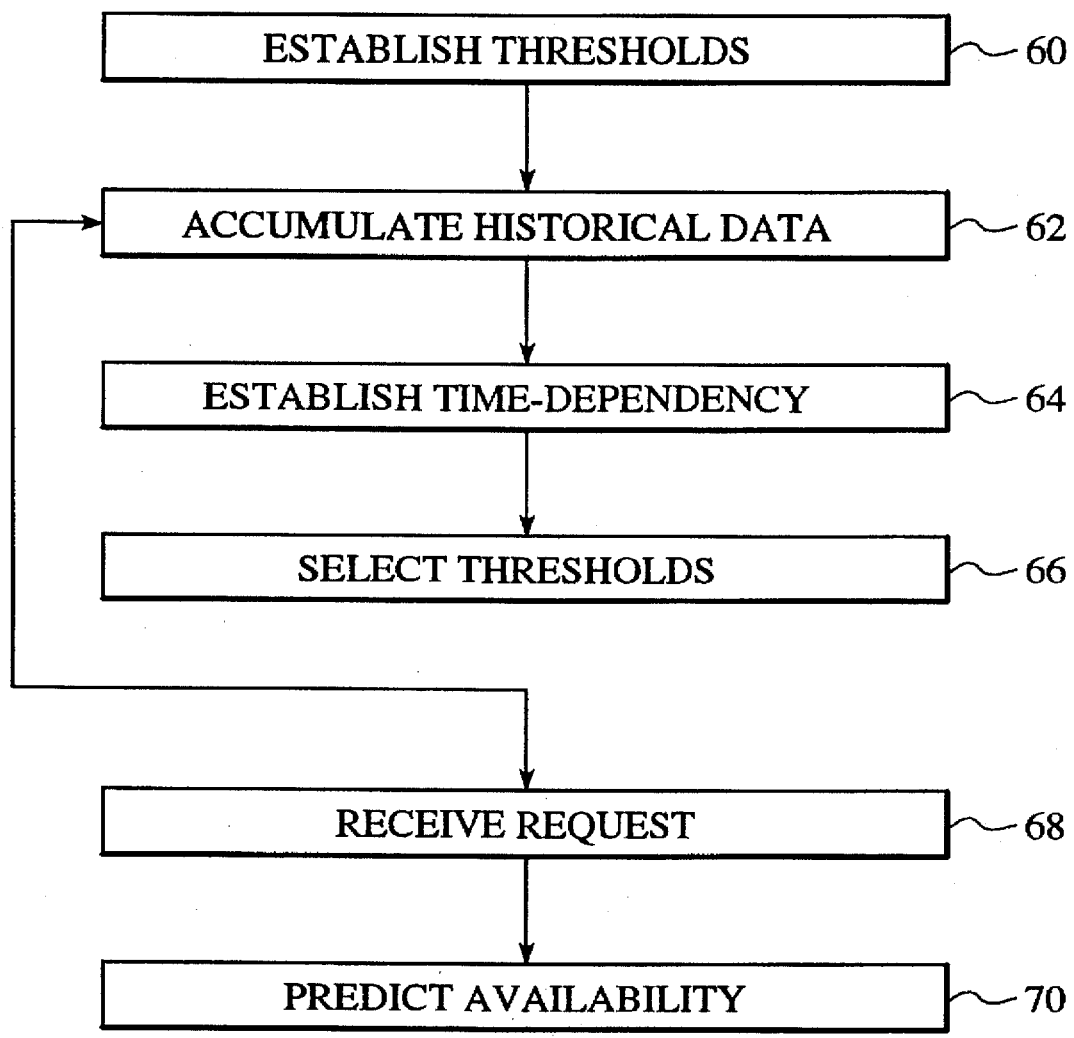
FIG. 2 is a flow chart of steps for determining and implementing utilization thresholds for the dynamic bandwidth allocation of FIG. 1.

Referring now to FIG. 2, possible steps for establishing and maintaining threshold levels are shown. The order of the various steps may be easily varied. In step 60, initial thresholds are set. There may be a number of different thresholds. For example, there may be a different threshold for line shelf utilization than for switching fabric utilization. This would be the case if blockage at a line shelf is of less concern than blockage at the switching fabric, which would prevent any incoming and outgoing calls from the network node. Another different threshold would be one which would trigger restoration of the original quality of service to sessions which previously experienced a reduction in bandwidth. As an example, bandwidth reduction of intranodal and/or internodal session may be triggered when a line shelf reaches 98% capacity or when a switching fabric reaches 95% capacity, while bandwidth restoration may require that the capacity levels then fall below 90% utilization. This prevents the fluctuations between the desired bandwidth and the reduced bandwidth from being so frequent as to detract from the communication.

At step 62, data is accumulated regarding the utilization of resources for various times. There may be a learning period in which the historical data of resource utilization is collected for predictive allocation. The accumulated data is then employed to vary the utilization thresholds on an hour-by-hour and/or day-by-day basis, while updating the data continually. Time dependency is established at step 64. The time dependency may be based upon the prediction of resource utilization. Alternatively, the time dependency may be fixed, eliminating the requirement of the step 62 of accumulating historical data. Time-dependent thresholds carry the advantage of ensuring that there are adequate free resources during peak traffic hours (e.g., 8:00 AM to 5:00 PM), while not wastefully freeing resources during low-demand times. A step 66 of selecting thresholds is periodically executed in order to implement the time-dependency established at step 64.

If the historical data of resource utilization is accumulated, the data may be used to predict availability of bandwidth for anticipated telecommunications sessions. In FIG. 2, a request 68 is received from a party who knows in advance that a session that requires a particular bandwidth will be initiated at a certain time. The party may request advance information regarding the availability, allowing the PBX to use a utilization histogram as the basis of predicting availability. If the necessary bandwidth is not likely to be available, an alternative time can be selected for the session. Predictive availability also allows multiple requirements for large bandwidth sessions to be prenegotiated, reducing the likelihood that a particular session will suffer bandwidth reduction.

Figure 3:
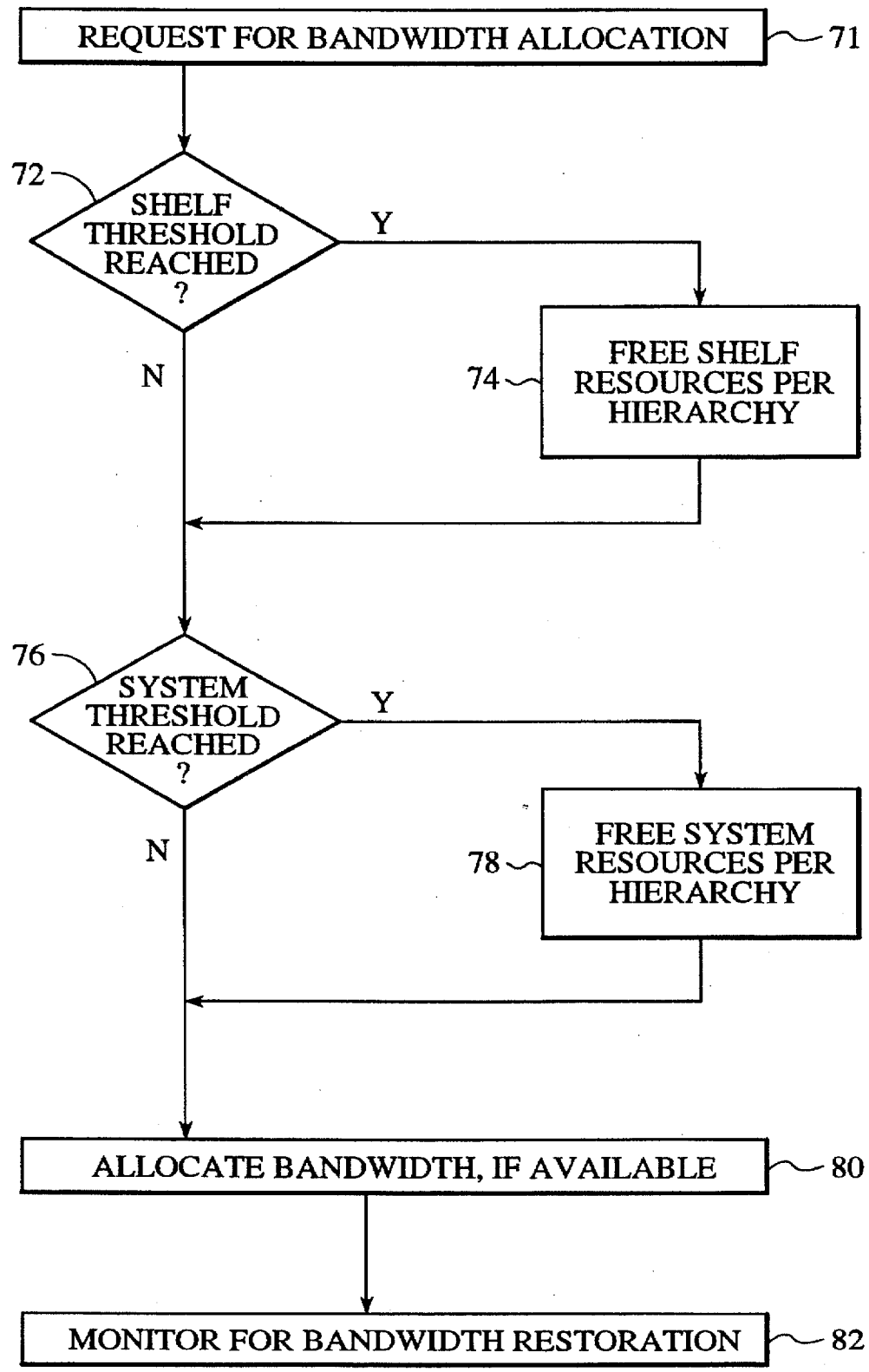
FIG. 3 is a flow chart of steps for reducing and/or restoring resources based upon the thresholds that are established according to FIG. 2.

With reference to FIGS. 1 and 3, steps for carrying out dynamic bandwidth allocation for the network node 10 are shown. The steps shown in FIG. 3 may be carried out continuously or periodically. Optionally, the steps are executed each time a call sequence is initiated for an intranodal or internodal session, which is shown in FIG. 3 as a step 71 of receiving a request for bandwidth allocation. In step 72, the determination is made as to whether the utilization threshold has been reached for a line shelf. For an internodal session between user units 18-22 that are supported by different line shelves 12-16, the determination is made for both of the involved line shelves. If there are sufficient resources to accommodate additional sessions without reaching the point at which the risk of blockage is unacceptable, no action is taken in response to the step. On the other hand, if the utilization threshold has been reached or exceeded, bandwidth is freed at step 74. In most embodiments, this involves releasing channels from established sessions. The sessions that are affected depend upon a hierarchy of the classes of service. For example, an officer of a corporation that utilizes the PBX may be assigned a higher class of service than the other employees of the corporation. However, the use of the hierarchy is not critical to the invention.

By freeing the resources at step 74, the quality of service of the affected telecommunications sessions will be somewhat reduced. However, step 74 is not carried out in a manner that would reduce the bandwidth to a level below the bandwidth required for continuing the session. This may be ensured by reference to the hierarchy of the classes of service.

At step 76, the determination is made as to whether an additional call would render the network node susceptible to a system-wide blocking condition. That is, the utilization threshold of the switching fabric 36 and other components that are common to all of the line shelves 12-16 is considered. If the threshold has not been reached, no action takes place in response to this step. On the other hand, if the utilization threshold has been reached, system resources are freed at step 78. As a result, additional bandwidth is freed for adding sessions. Other than the components that are affected, step 78 is substantially identical to step 74. The hierarchy, if one exists, is consulted and no session is reduced to a bandwidth that does not satisfy the basic needs of the session.

If available, bandwidth is allocated at step 80 to any additional incoming or outgoing calls in the conventional manner. However, at step 82 the availability of resources is monitored to determine whether the termination of previously established sessions reduces the utilization of resources to a level below a restoration threshold that triggers the restoration of bandwidth to sessions that experienced the reduced quality of service at step 74 or at step 78. For an intranodal session, the bandwidth restoration may take place unilaterally. That is, the network node 10 may restore the original quality of service without negotiation. In the preferred embodiment, on the other hand, the network node negotiates with any affected node of an internodal session prior to restoring the original bandwidth.

I claim:

1. A network node within a telecommunications network of nodes comprising:

a first group of subscriber lines of said network node for providing telecommunication;

first support means connected to said first group for providing access and control to said subscriber lines of said first group;

at least one second group of subscriber lines of said network node for providing telecommunication;

second support means connected to said second group for providing access and control to said subscriber lines of said second group;

switching means, connected to said first and second support means, for routing intranodal telecommunications connections among said subscriber lines of said network node and for routing internodal telecommunications connections between said subscriber lines and other nodes of said telecommunications network via an external trunk;

utilization monitoring means, connected to each of said switching means and said first and second support means for monitoring availability of bandwidth and for monitoring available routing capacity of said switching means; and dynamic bandwidth allocation means, connected to said utilization monitoring means, for determining a specific bandwidth upon initiation of each intranodal telecommunications connection and for selectively varying the bandwidth for ongoing intranodal telecommunications connection based upon utilization of said first and second support means and based upon available routing capacity of said switching means.

2. The network node of claim 1 wherein each of said first and second support means is a line shelf for supporting multimedia communications, said switching means being a switching fabric which initiates access of channels of said line shelves in order to establish each multimedia communication, thereby defining bandwidth at initiation of a session of said multimedia communication.

3. The network node of claim 2 wherein said utilization monitoring means has a predefined maximum threshold with respect to detection of accessed channels for each of said line shelves, said dynamic bandwidth allocation means being linked to selectively free accessed channels when said utilization monitoring means detects that said predefined maximum threshold has been reached, thereby reducing bandwidth of at least one multimedia communication that is in session.

4. The network node of claim 3 further comprising memory means, connected to said dynamic bandwidth allocation means, for storing a hierarchy of possible intranodal multimedia communications with respect to which communication is to experience a reduction in bandwidth when said predefined maximum threshold is detected.

5. The network node of claim 3 further comprising threshold setting means, connected to said dynamic bandwidth allocation means, for varying said predefined maximum threshold as a function of time.

6. The network node of claim 3 wherein said utilization monitoring means further includes a predefined minimum threshold with respect to accessed channels for each of said line shelves, said dynamic bandwidth allocation means being linked to selectively access free channels to increase bandwidth of intranodal multimedia communications that are in session when said termination of telecommunications sessions results in said predefined minimum threshold being reached.

7. The network node of claim 6 further comprising threshold setting means, connected to said dynamic bandwidth allocation means, for varying said predefined minimum threshold as a function of time.

8. The network node of claim 1 wherein said switching means is a switching fabric having a fixed capacity with respect to routing telecommunications connections, said dynamic bandwidth allocation means being linked to said utilization monitoring means to trigger selective reduction of accessed channels when said utilization monitoring means detects that a predefined threshold of said routing capacity has been reached.

9. The network node of claim 1 further comprising groups of subscriber lines in addition to said first and second groups, each of said groups being supported by a different support means having a plurality of channels, each of said groups being connected to said utilization monitoring means and said dynamic bandwidth allocation means.

10. A method of dynamically allocating channels of a first node in a telecommunications network of nodes, said first node having a plurality of line shelves, each supporting a plurality of channels for intranodal and internodal telecommunications sessions by means of a switching fabric connected to each line shelf, said method comprising steps of:

tracking traffic through each line shelf to determine the extent of available channels for establishing telecommunications sessions; and in response to tracking traffic, selectively reallocating channels of established telecommunications sessions to free additional channels for additional telecommunications sessions, including selectively reducing channels allocated for at least one of said intranodal telecommunications sessions supported by a first line shelf for which channel capacity is detected to be substantially exhausted.

11. The method of claim 10 wherein said step of tracking traffic includes detecting when utilization of channel capacity of said first line shelf exceeds a predefined maximum threshold.

12. The method of claim 11 further comprising selectively increasing allocation of channels to established intranodal telecommunications sessions when termination of other telecommunications sessions supported by said first line shelf reduces utilization of channel capacity of said first line shelf to below a predefined minimum threshold.

13. The method of claim 12 further comprising establishing criteria by which said predefined maximum and minimum thresholds vary as a function of time.

14. The method of claim 13 wherein said step of establishing criteria includes collecting historical data of channel allocation and includes adaptively applying said collected historical data for predicting channel allocation as a function of the time of day and as a function of the day.

15. The method of claim 14 further comprising utilizing said collected historical data as a basis in predicting availability of a bandwidth requested by a user prior to setup of a particular telecommunications session, said method further comprising providing notice of said prediction of bandwidth availability for said particular telecommunications session.

16. The method of claim 11 further comprising steps of monitoring switching capacity of said switching fabric and selectively reallocating channels of established telecommunications sessions when switching capacity is detected to be substantially exhausted.

17. The method of claim 16 wherein said step of selectively reallocating channels of established telecommunications sessions includes freeing channels of selected intranodal telecommunications sessions.

18. The method of claim 11 further comprising defining a hierarchy of session types for which said step of reallocating channels of established telecommunications sessions is to be implemented, such that channels allocated to said established telecommunications sessions are subject to reallocation at least partially based upon said hierarchy.

19. A method of allocating bandwidth for conferences in which connections are formed via a first private branch exchange (PBX) having a plurality of multimedia line shelves and a switching fabric, said method comprising steps of:

initiating multimedia conferencing sessions, including determining bandwidths for said sessions;

monitoring availability of resources of components of said first PBX, including resources of each multimedia line shelf and resources of said switching fabric; and triggering reassignment of said resources to said sessions upon detecting that availability of said resources is less than a predetermined threshold level, such that bandwidth of at least one session is reduced, reassigning said resources including:

(a) for a session that is between a user of said first PBX and a user of a second PBX, negotiating with said second PBX to free resources at said first PBX for use in initiating additional multimedia conferencing sessions; and (b) for a session that is between users of said first PBX, reducing bandwidth of said at least one session based upon freeing resources of a specific component of said first PBX, said specific component being a PBX component that is detected to have resource availability that is less than said predetermined threshold level.

20. The method of claim 19 wherein said step of reducing bandwidth based upon freeing resources of said specific component is a step that includes reducing channel allocation of one of said multimedia line shelves when said one multimedia line shelf is detected to have channel utilization that is above a maximum threshold.

21. The method of claim 19 further comprising restoring said bandwidth of said at least one session when said availability of resources increases such that channel utilization is below a minimum threshold.

* * * * *